(12) United States Patent
Dimenstein (10) Patent No.: US 6,732,275 B1
(45) Date of Patent: May 4, 2004

(54) SECURING ENCRYPTED FILES IN A PC AND PC PERIPHERAL ENVIRONMENT

(75) Inventor: Zachary David Dimenstein, Bronx, NY (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/532,880

(22) Filed: Mar. 22, 2000

Related U.S. Application Data (60) Provisional application No. 60/121,823, filed on Mar. 23, 1999.

(51) Int. Cl.$^7$ ................................................. H04L 9/00
(52) U.S. Cl. ..................... 713/193; 713/191; 713/200; 713/183
(58) Field of Search .............................. 713/193, 191, 713/200, 202, 183, 185, 189

(56) References Cited

U.S. PATENT DOCUMENTS

| | | | | |
|---|---|---|---|---|
| 5,930,358 A | * | 7/1999 | Rao ............................. | 713/193 |
| 6,314,409 B2 | * | 11/2001 | Schneck et al. ............... | 705/54 |
| 6,487,663 B1 | * | 11/2002 | Jaisimha et al. ............. | 713/193 |
| 6,550,011 B1 | * | 4/2003 | Sims, III ..................... | 713/193 |
| 6,636,607 B1 | * | 10/2003 | Yang et al. .................... | 381/2 |
| 2001/0021926 A1 | * | 9/2001 | Schneck et al. .............. | 705/54 |

* cited by examiner

Primary Examiner—Norman M. Wright
(74) Attorney, Agent, or Firm—Robert E. Bushnell, Esq.

(57) ABSTRACT

A process and apparatus for ensuring that encrypted files accessed either in a personal computer or in the peripheral environment of a personal computer, are kept secure. Encrypted files are accessed by the user of a personal computer through the use of either a separate peripheral or an interface card, collectively referred to as a decryption device, that decodes the contents of the files on the basis of decoding information. Each file is always maintained in an encrypted format while stored in the personal computer, thereby making it difficult for anyone to be able to illegally copy and distribute those files in an unencrypted format.

20 Claims, 4 Drawing Sheets

SECURING ENCRYPTED FILES IN A PC AND PC PERIPHERAL ENVIRONMENT

CLAIM OF PRIORITY

This application makes reference to, incorporates the same herein, and claims all benefits accruing under 35 U.S.C. §119 from a provisional application for Securing Encrypted Files in a PC and PC Peripheral Environment earlier filed under 35 U.S.C. §111 (b) in the United States Patent & Trademark Office on the 23rd of March 1999 and there duly assigned Ser. No. 60/121,823.

FIELD OF THE INVENTION

The present invention generally relates to a process and apparatus for ensuring that encrypted files accessed in a personal computer and used in the peripheral environment of the personal computer, are kept secure, and, more particularly, to a system and process where encrypted files are kept in an encrypted format while stored in the personal computer and are accessed by the user of the personal computer through the use of either a separate peripheral or interface card (collectively sometimes referred to as a "decryption device") that decodes the files.

BACKGROUND OF THE INVENTION

The personal computer (i.e., a "PC") is increasingly being used to store, display, play and copy the digital content of copyrighted files for amusement or personal use. An operator of a PC can gain access to copyrighted digital content from several different sources, including optical based media (CD's, DVD-ROM's, etc.) and from servers connected to the Internet. While there is general agreement within the industry that it is desirable to allow PC users to continue to have access to copyrighted digital content through their PC's and PC peripherals, there has also been a desire expressed by the recorded music and other industries that provide copyrighted digital content to find a way to effectively protect their content from illegal copying and distribution by PC's.

A common method currently used to inhibit illegal copying of files containing copyrighted digital content by using a PC is to rely upon file encryption techniques with software that has been installed on only certain PC's that have been designated to decode the files. Although these encryption techniques are designed to inhibit the ability of a PC user to gain access to content of the files while the content is in an unencrypted format, unscrupulous PC hackers who have acquired a fundamental understanding of the operational protocol of the PC have demonstrated an ability to access these files while the content of the files is in an unencrypted format whenever the content is being played or displayed by the PC. Hackers have, in essence, exploited the standard open architecture of the PC together with the fact that the PC is required to convert these files into an unencrypted format in order to play or display the protected content.

SUMMARY OF THE INVENTION

It is therefore, one object of the present invention to provide an improved process and apparatus for securing protected files from unauthorized use.

It is another object to provide a process and apparatus able to provide a heightened discouragement of anyone seeking to illegally copy and distribute protected files in an unencrypted format.

It is still another object to provide a process and apparatus able to secure protected files that are accessed in a personal computer and used in the peripheral environment of the personal computer.

It is yet another object to provide a process and apparatus to maintain the security of protected files that may be used in a peripheral environment by keeping the files in an encrypted format while stored in the personal computer.

It is still yet another object to provide a process and apparatus enabling a user to play and display the contents of a file through the use of either a separate peripheral or interface card, after the encrypted file has been accessed through the use of a personal computer, while forestalling duplication of the unencrypted digital contents of the file.

It is a further object to deny a PC access to copyrighted protected files while those files are in use in an unencrypted format.

These and other objects are attainable by taking advantage of the fact that a unique decryption key based upon characteristics intrinsically resulting from storage of a selected file on a recording medium such as a compact disk or a digital video disk, in an encrypted format. This type of decryption key inherently is rare and likely unique, and serves to verify that the owner of the recording medium has possession of a licensed copy of the selected file. The decryption key may be used by either the personal computer or a discrete decryption device, to apply a decryption algorithm to decrypt the selected file. As long as an encrypted file is not decoded by using the PC to directly decrypt the content of the file, the decrypted content will not appear within the open architecture of the PC while the file is in an unencrypted format. Decryption devices such as separate PC peripherals or PC interface cards may be driven by PC's to decrypt selected encrypted files so that the digital content of the files may be displayed or played under control of the decryption device as the decryption device converts the digital contents of the encrypted file into an analog output signal such as audio frequency signals for driving either the PC's monitor and speakers, or the monitor and speakers of a PC peripheral, after the PC serves to initiate the administration of the decryption protocol. Unlike the PC, the decryption device lacks an open architecture, and the encrypted files are decoded by the decryption device while using an algorithm stored within the decryption device. Although the files may be temporarily stored in unencrypted format in a buffer within the decryption device, the buffer can only be accessed by the internal circuitry of the decryption device. The output from the decryption device is in an analog format appropriate for output to a speaker or a video display, depending on the type of file. The encrypted files and decoding information may be accessed by the PC from various sources, either concurrently or, alternatively, separately, and then transferred from the PC to the decryption device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Figure 1:
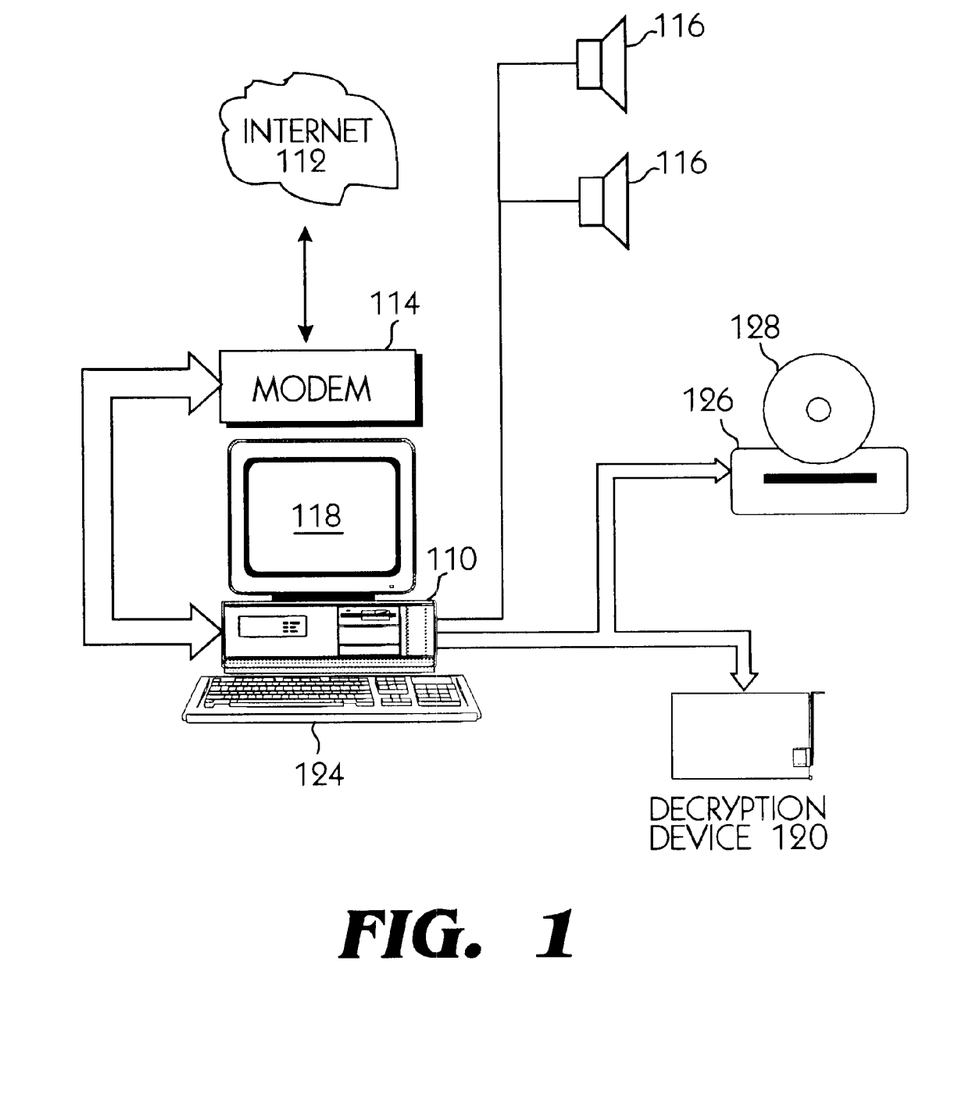
FIG. 1 is a schematic diagram illustrating the components of a system that may be used in the practice of the present invention.

Turning now to the drawings, FIG. 1 illustrates one embodiment of a system suitable for decrypting a file in accordance with the principles of the present invention. This system may be constructed with a microprocessor controlled personal computer 110 that may be connected to the Internet 112 by, for example, a modem 114. Software that is compliant to the specifications of this invention is loaded within the memory of personal computer 110. Either a PC peripheral or PC card may serve as a decryption device 120 to decrypt the file on the basis of decryption information, and thereby convert the encrypted file into a format that may be played and either broadcast via audio speakers 116, visually displayed on the screen 118 of either a liquid crystal display or a video monitor 122 driven by computer 110, or simultaneously broadcast via speakers 116 and visually displayed on screen 118. A keyboard 124 may be used to enable a user to manually control input to and operation of computer 110. A disk drive 126 able to read memory disks 128 such as either compact disks (i.e., CD's), digital video disks (i.e., DVD's), or both compact disks and digital video disks, is operationally coupled to and driven by computer 110.

Figure 2:
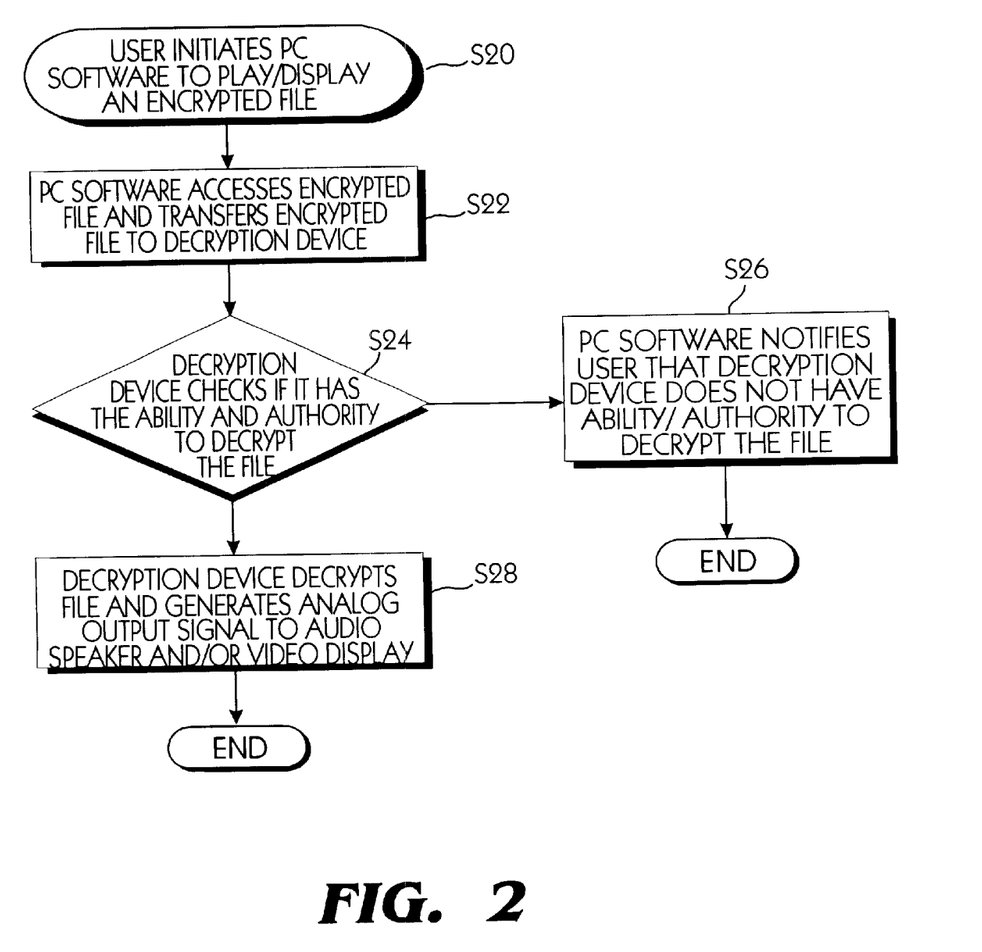
FIG. 2 is a flowchart illustrating a process for decoding encrypted files and generating analog video and audio output by using a decryption device.

Turning now to FIG. 2, the system shown in FIG. 1 may be used when, in step S20, the user of PC 110 selects a desired file by using either keyboard 124, a touchpad mounted upon keyboard 124, or a mouse (not shown) coupled to computer 110, and then initiates program software to either play, display or both play and display the contents of an encrypted file over the audio speakers 116 and monitor 118 of PC 110. During step S22, PC 110 accesses the selected file either from a to computer server (e.g., while PC 110 is connected to the Internet 112), over a local area network, from a local storage medium such as a CD or DVD or from some other source, and the encrypted file that the user selected is transferred to PC 110. Then, program software previously loaded within the memory of personal computer 110, either automatically or after prompting by the user, transfers the selected file while the selected file is still in an encrypted format, to decryption device 120. The file can be transferred by the PC in either a compressed or in a decompressed format. If the file is in a compressed format, the file can be decompressed by computer 110 or the decompression may be performed by decryption device 120. The file may optionally also be watermarked by the software loaded within the memory of personal computer 110 or by decryption device 120, with identification information unique to PC 110 and decryption device 120.

During step S24, decryption device 120 first checks for Serial Copy Management System (SCMS) and other encoding related information within the file to determine whether decryption device 120 is authorized to decrypt the particular file that was selected by the user. If the encoding related information fails to indicate that decryption device 120 is authorized to decrypt the selected file, in step S26 the program software of PC 110 notifies the user that decryption device 120 lacks the ability and authority to decrypt the selected file. If however, the encoding related information accompanying the selected encrypted file establishes that decryption device 120 is authorized to decrypt the selected file, decryption device 120 utilizes the encoding information during step S28 to decrypt the encrypted file. Decryption device 120 can begin the decryption process while the transfer of the encrypted file is in progress or, alternatively, decryption device 120 may decrypt the selected file after the file has been completely transferred to decryption device 120. As the file is decrypted, decryption device 120 uses the decrypted file to generate an analog output signal that can be fed back to the screen 118 and speakers 116 of PC 110, depending on the content of selected file. Alternatively, the analog output signal may be displayed or played on a video display or speakers that are not used by the PC and are driven under control of decryption device 120, independently of PC 110. Audio volume, video and text formatting, and other file parameters can be controlled through a user interface that accesses the software loaded within one of the memories of either personal computer 110 or decryption device 120; decryption device 120 uses this information to alter the analog output signal accordingly.

There are several ways in which the decoding information can be obtained by decryption device 120 including one or a combination of the following: using encoding information that is already stored within decryption device 120. The encoding information may be downloaded from either PC 110 or from the Internet 112 via PC 110. Alternatively, the encoding information may be accessed from a local storage media such as a CD or DVD 128 as the encoding information is read by disk drive 126 from the CD or DVD 128.

Decryption device 120 may have encoding information stored within its memory that may be used to decrypt an encrypted file. The encoding information could have been stored on the device before it was shipped by a licensed manufacturer or distributor, or the encoding information could have been entered into the memory of decryption device 120 during an initialization procedure conducted by the program software already stored within the memory of personal computer 110. This encoding information may be used to perform functions beyond the decryption of selected encrypted files. By way of example, in the event that an Approved Web Site Database is downloaded by PC 110 in order to differentiate between files downloaded from approved web sites from those downloaded from unapproved web sites, the operational software loaded within the memory of personal computer 110 will be able to verify that the Approved Web Site Database has not been tampered with or replaced by some unscrupulous PC hacker by using an encoding scheme stored on decryption device 120.

Figure 3:
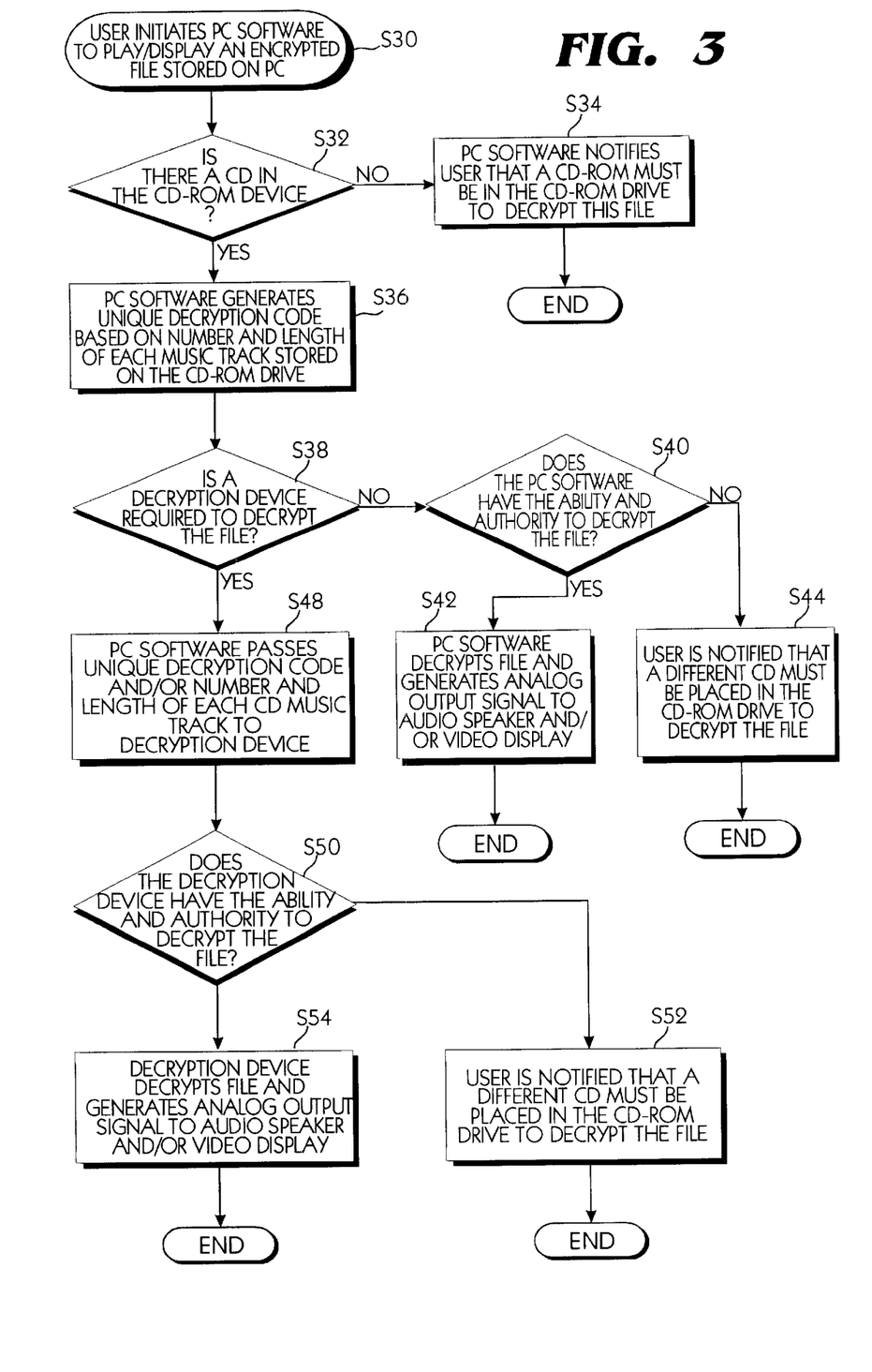
FIG. 3 is a flowchart illustrating a process for encrypting and decrypting a file where the file can only be decrypted, played and displayed if a particular CD or DVD is stored within the CD/DVD drive that is operationally controlled by the PC.

Turning now to FIG. 3, the user initiates software stored on personal computer 110 during step S30, in order to play and display the protected content of an encrypted file that is, for example, stored in the memory of the PC 110. A determination is made in step S32 about whether a disk such as CD-ROM 128 has been loaded into disk drive 126? If no disk 128 is detected within disk drive 126, during step S34 PC 110 notifies the user with a message displayed upon screen 118, that a CD-ROM must be loaded into disk drive 126 before the file stored on disk 128 may be decrypted. If however, step S32 establishes the presence of a disk within disk drive 126, the program software of PC110 generates a unique decryption code during step S36; the unique decryption code may be based upon the number and length of each track of music or other information stored on the CD-ROM or DVD disk 128 that was loaded into disk drive 126.

Subsequent to the generation of the unique decryption code during step S36, a determination is made during step S38 of whether a decryption device 120 is required to decrypt the selected file? If the determination made during step S38 establishes that a decryption device 120 is not required, a subsequent determination is made during step S40 of whether the program software loaded onto PC 110 has the ability and authority to decrypt the selected file? If the determination made during step S40 establishes that the program software has the ability and authority, the program software loaded onto PC 110 proceeds to decrypt the selected file and generate an analog output signal that may be selectively applied to audio speakers 116 and video monitor 118. Alternatively however, if step S40 establishes that the program software lacks either the authority or the ability to decrypt the selected file, the use is notified, for example, a video message on screen 118 that a different CD must be placed in CD-ROM, or DVD drive 126 before the selected file may be decrypted.

If step S38 establishes that decryption device 120 is required, then during step S48 the program software loaded onto PC 110 transfers the unique decryption code or alternatively, the number and length of each track of information on disk 128 to decryption device 120. Alternatively, PC 110 may transfer both the unique decryption code and the identifying characteristics of disk 128 such as the number and length of each CD music track to decryption device 120. Subsequently during step S50, a determination is made to establish whether decryption device 120 has the ability and the authority to decrypt the selected file that should be present on disk 128. If step S50 establishes that decryption device 120 lacks either the authority or the ability to decrypt the selected file, the user is notified during step S52 that a different disk 128 must be loaded into the disk driver 126 before the selected file may be decrypted. If step S50 determines however, that decryption device 120 has both the authority and the ability to decrypt the selected file, during step S54 decryption device 120 proceeds to decrypt the selected file and to generate an analog output signal that is supplied to either, or both, audio speakers 116 and variable video display 118.

Figure 4:
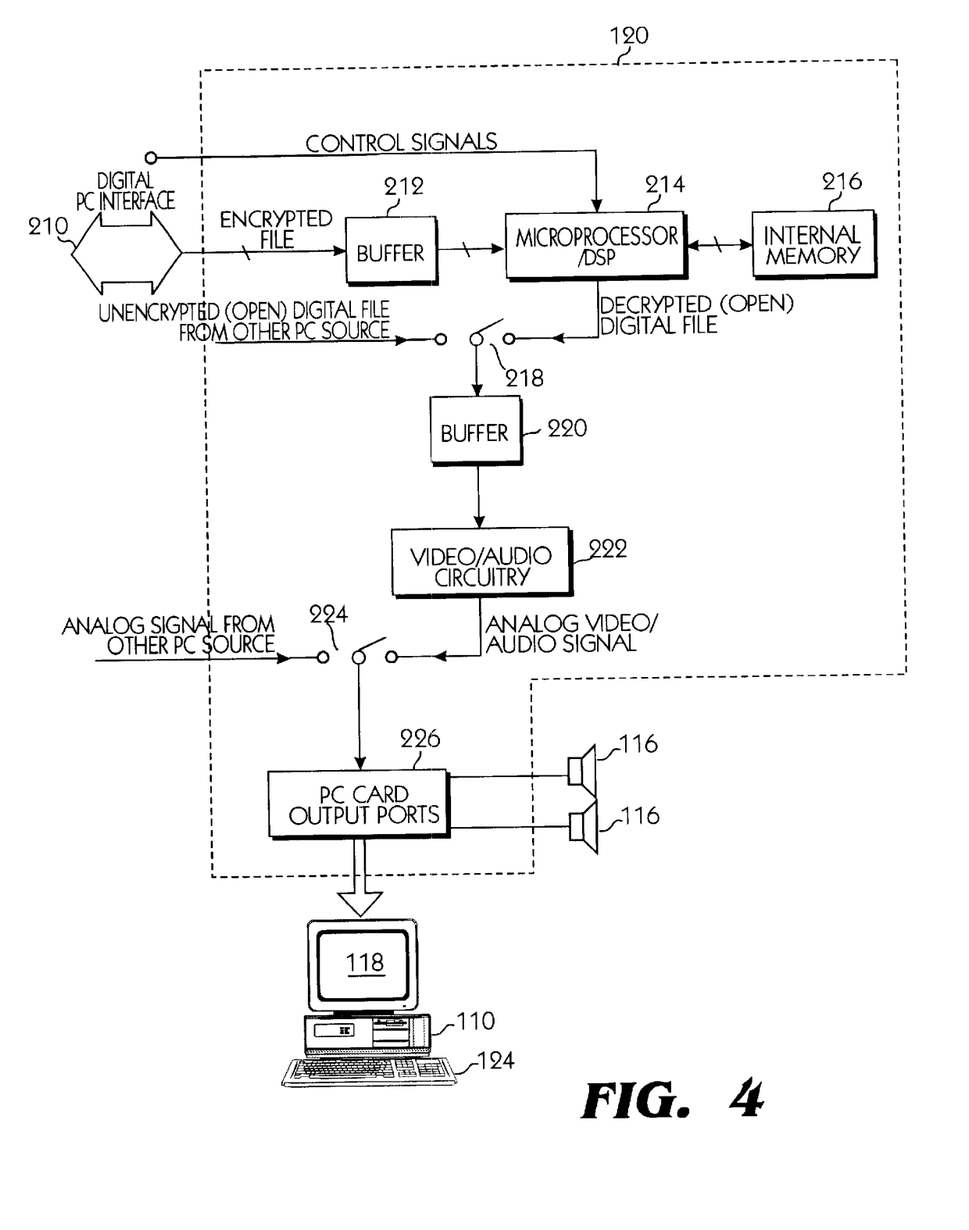
FIG. 4 is a schematic diagram illustrating an alternative design for the implementation of an interface card suitable for use as an encryption device.

FIG. 4 illustrates one implementation of a decryption device 120, in the form of a microprocessor based circuit board. A digital PC interface 210 either in the form of a plug and socket electrical connection, or alternatively, a ribbon cable or fiber optic cable enables transmission of the encrypted selected file from PC 110 to buffer 210 of decryption device 120. Control and timing signals are applied from PC 110 to microprocessor base digital signal processor 214 of device 120, and its internal memory 216. The encrypted selected file received from buffer 212, is decrypted by signal processor 214 and, depending upon the operational state of switch 218, transfer to intermediate buffer 220. A decryption algorithm may be stored within internal memory 216.

Alternatively to transfer of an encrypted file to device 120, an unencrypted, open, digital file that has been selected by the user from another source, may be transferred from PC 110 to buffer 220 via switch 218. The video and audio circuits 222 convert whatever unencrypted selected digital file received by buffer 220 into an analog video and analog audio output signal that is applied, via switch 224, to the output ports 226 of device 120, either directly to speakers 116 and monitor 118 or, alternatively, to the corresponding audio and video cards of PC 110, albeit, under the direct control of device 120. As another alternative, an analog video, analog audio or both analog video and analog audio signals from other sources may be transferred from PC 110 to the output ports 226 via switch 224, and subsequently applied to speakers 116 and monitor 118.

The program software stored within the memory of personal computer 110 may have access to special decoding information that maybe either downloaded from the Internet or otherwise stored within the program software that is stored within the memory of personal computer 110 itself. The program software that is stored within the memory of personal computer 110 does not use the encoding information to decrypt the selected file, but rather transfers the selected file to decryption device 120 along with linking information that associates the encoding information to the encrypted file that has been transferred to decryption device 120. For added security, the encoding information transferred by the PC may be restricted to only part of the decoding data required to decrypt the file, and decryption device 120 can combine that data with encoding information that is already stored within the memory of decryption device 120.

Alternatively, a compact disk or other media such as a digital video disk 128, may contain encoding information that the program software stored within the memory of personal computer 110 can access and then transfer to decryption device 120. In addition to accessing encoding information that may be stored on a CD, a specific application program may be applied to generate its own dedicated encoding information based on unique information contained within the CD, thereby enabling only those users who own specific compact disks to be able to decrypt a file accessed from the Internet or from another source. In order to do this, the program software loaded within the memory of personal computer 110, using a specified algorithm, accesses information unique to the CD, perhaps related to one or more of the physical characteristics of the selected file as that file is stored on a recording medium such as a CD or DVD disk 128, such as the number of music tracks and the length of each track stored on a CD in order to generate a unique value. The length of each track could be stated in minutes and seconds or by using the number of bytes required to store that particular track on the digital storage medium. The encrypted file selected by the user has been encoded so that only a unique value that corresponds to that specific CD may be used to decrypt that s selected file. One technique to do this would be to generate an encryption key with a value that directly corresponds to the number of music tracks on the CD containing the selected file and the length of each track on that CD. By way of example, if the number of tracks recorded onto a particular CD is three, and the length of each of the tracks is 10, 20 and 30 minutes, respectively, then the number 3102030 could be utilized to make an encryption key, and to uniquely encrypt and to decrypt a particular file. An alternative approach that would provide more unique encryption key may use seconds, fractions of seconds and the number of bits of the length of each file to increase the likelihood that each CD has a unique code. There are many other variations of ways in which a unique value can be created based on the number and length of each track and other unique information stored on a particular CD, where that unique value is in turn utilized to encrypt a file by using any one of the several file encryption technologies currently on the market, so that only a decoding algorithm provided with that unique value will be able to decode the encrypted file.

Alternatively, in addition to or instead of encrypting a file based on the generated unique code, the file can also be watermarked so that the source of the file can more easily be tracked. For added security, the file can be encrypted so that in addition to the unique value generated by the program software stored within the memory of personal computer 110, additional encoding information that is stored only within the memory of decryption device 120 is required in order to decrypt the file. Alternatively, all of these decrypting process can be combined and performed by decryption device 120, or in a different implementation of the principles of the present invention, performed by the microprocessor based personal computer 110 independently of, and without the assistance of decryption device 120.

The decryption algorithm may, in an embodiment that uses a discrete decryption device 120, be stored in the internal read only or random access memory 216 accessed by microprocessor 214. In an alternative embodiment that does not employ a discrete decryption device 120, the decryption algorithm may be stored either in the hard disk of computer 110, or alternatively, in a read only or in a programable memory.

This invention is flexible in that it allows for the display or playing of encrypted files on either the PC's own display or speakers or on a display or speakers that are not used by the PC. The use of a PC interface card that is typically installed within the housing of PC 110, as decryption device 120 would be appropriate in the situation where the visual display provided by monitor 110 and speakers 116 are used to display and aurally broadcast the contents of the selected file after decryption. In this scenario, the PC interface card can be installed inside the PC and be fairly transparent to the user. The PC interface card can be designed to allow for a single connection to the video display and speakers regardless of whether the interface card is being used to decrypt the files or whether the internal decryption circuitry of the interface card is bypassed. Additionally, decryption device 120 can be designed to reuse the video and audio circuitry of other PC interface audio and video cards by establishing either a direct physical or logical connection between decryption device 120 and the audio and video cards, preferably with decryption device 120 serving as the master, thereby bypassing the ordinary techniques used by the operating system of PC 110 for outputting files.

Regardless of whether decryption of the selected file is performed by personal computer 110 or by decryption device 120, decryption may be performed on either the entire selected file or as the file is streamed during downloading or reading. When the file is decrypted while streamed, the file may be decrypted, in an extreme example, in one bit at a time.

PC peripherals may be used as appropriate decryption devices when a display or speakers different from the ones connected to the PC are to be used. In the event that the file contains text, graphics or video, a peripheral device driven by personal computer 110 could potentially be a portable electronic pad with its own variable visual display or another consumer electronics device capable of storing and displaying text, graphics and video. In the event that the file contains spoken text or music audio, a peripheral device driven by personal computer 110 could potentially be a portable music player or another consumer electronics device capable of storing and playing spoken and music audio.

A system which uses the physical characteristics intrinsic to the storage of a file upon a recording medium such as a CD or DVD to control encryption and decryption, whether using either the personal computer 110 directly to decrypt the selected file or using a peripheral device driven by personal computer 110 or PC card decryption device, helps to identify the user of PC 110 as the owner of a lawfully licensed copy of the selected or other associated file, and thereby ensure that an encrypted file is not illegally copied and distributed in an open format. When the principles of the present invention are performed by using decryption device 120 instead of PC 110 to provide file decryption, and the analog output of decryption device 120 is applied to enable the display or playing of the file, a system may be constructed with the following components:

Encrypted File

The encrypted file can be accessed by a PC from numerous sources such as a server on the Internet or from a CD-ROM. The file can be in either a compressed or uncompressed format. If in a compressed format, the file can be decompressed either on the PC or on decryption device 120. The file can also be watermarked with identification information unique to that PC or A peripheral device driven by personal computer 110 either by the PC or by the Encryption Device.

PC & PC Software

Software loaded within the memory of personal computer 110 that is compliant with this invention should be installed on the PC. This software, when loaded within the memory of personal computer 110, controls the transfer of the encrypted file and decoding information to decryption device 120. It can also watermark the encrypted file.

PC Interface Card or PC Peripheral (Decryption Device)

Decryption device 120 uses decoding information that it accesses from the Software loaded within the memory of personal computer 110 and/or internally to decrypt the encrypted file. It can begin processing the file as it is being transferred by the PC or alternatively it can do the processing after the file has been transferred. Decryption device 120 uses the file to generate an analog output appropriate for a video display and/or audio speakers. Audio volume, video and text formatting and other file parameters can be controlled by the end user through a user interface that is integrated into the Software loaded within the memory of personal computer 110 or decryption device 120; decryption device 120 uses this information to alter the analog output accordingly.

A PC interface card implementation can allow for the use of a single analog video/output port to the video display and speakers of a PC by allowing unencrypted video and audio data that are not processed by decryption device 120 to still sham the same analog output port circuitry.

A PC interface card implementation that reuses the video and/or audio circuitry of other PC interface audio/video cards by establishing a direct physical and/or logical connection between decryption device 120 and the audio/video, thereby bypassing the PC operating system's ordinary methods for outputting files.

A system which allows for an encrypted file to be decrypted only by a PC user who has a particular CD or DVD in the PC's CD or DVD drive. The system is comprised of the following components:

CD, DVD or Alternative Digital Storage Media

The digital storage media can contain content such as audio, video and/or text. Information such as the number of tracks and the length of each track on the digital storage media should be readily obtainable by the Software loaded within the memory of personal computer 110.

Encrypted File

The encrypted file is encrypted using a specified encoding algorithm that is unique to a specific CD or DVD based on information such as the number of tracks and length of each tack on a particular CD or DVD. For added security, the encoding algorithm can require additional decoding information that is only available on a PC card or a peripheral device driven by personal computer 110 serving in lieu of decryption device 120; alternatively, decryption device 120 can generate all of the encoding algorithm based on the CD based information passed to it from the PC. The encrypted file has a register which the software loaded within the memory of personal computer 110 can use to determine whether decryption device 120 is required to decode the file or whether the software loaded within the memory of personal computer 110 can decode the file autonomously.

PC Software

The software loaded within the memory of personal computer 110 implements a specified algorithm that uses information such as the number of tracks and the length of each track on a particular CD or DVD located in the CD/DVD player to generate a unique identification/encryption code for that CD or DVD. The algorithm used ensures that the generated identification code will only enable the decryption of an encrypted file if the appropriate CD or DVD has been placed inside a CD/DVD player connected to the PC. The encrypted file has a register which the Software loaded within the memory of personal computer 110 can use to determine whether the Decryption device 120 is required to decode the file or whether the Software loaded within the memory of personal computer 110 can decode the file autonomously.

Decryption Device

In the event that the encrypted file is intended only to be used through a Decryption device 120 (as described elsewhere in this document), the encrypted file utilizes additional decoding information that is located on the decryption device 120 in order to fully decrypt the file.

It may be seen that the foregoing paragraphs describe the details of a process and apparatus for ensuring that encrypted files accessed either in a personal computer or in the peripheral environment of a personal computer, are kept secure. The selection of an encrypted file that has a plurality of distinct tracks stored on a recording medium, with each of said tracks providing potentially different physical characteristics as recorded upon the recording medium, inherently forms a rare, and possible unique code specific to each disk. Possession of this code, assuming a uniform technique in the industry for formulating the decryption code from the physical characteristics of the recording medium, enables an authorized vendor to verify that the user of the PC 110 has possession of a lawful license to use the copy possessed by the user, and may also be used as a license to download from the vendor or an authorized server, associated or derivative works such as, by way of example, lyrics for the melody stored in the selected file, or alternatively, to access the same selected file at a different site. The same characteristics of the recorded file may also be used by the owner of the copyright to encrypt the file prior to recording.

Encrypted files are accessed by the user of a personal computer through the use of a separate peripheral or interface card collectively referred to as a decryption device, that decodes the files on the basis of decoding information. Each file is always kept in an encrypted format while it is stored in the personal computer, thereby making it difficult for anyone to be able to illegally copy and distribute those files in an unencrypted format. Unlike the PC, the decryption device lacks an open architecture, and the encrypted files are decoded by using an algorithm stored within the decryption device. Although the files may be temporarily stored in unencrypted format in a buffer within the decryption device, the buffer can only be accessed by the internal circuitry of the decryption device. The output from the decryption device is in an analog format appropriate for output to a speaker or a video display, depending on the type of file. The encrypted files and decoding information may be accessed by the PC from various sources and are then transferred from the PC to the decryption device.

What is claimed is:

1. A process for operating a personal computer, comprising:
    manually applying via an input device comprised of one of a keyboard, a touchpad and a mouse operationally coupled to a microprocessor and one or more memories accessed by said microprocessor of said personal computer, an indication establishing a selection of an encrypted file comprised of a plurality of distinct tracks stored on a recording medium, with each of said tracks providing potentially different physical characteristics as recorded upon the recording medium;
    reading encrypted data from said encrypted file;
    forming a decryption code based upon values of said physical characteristics;
    converting said encrypted data into decrypted data in dependence upon said decryption code;
    converting said decrypted data into output data; and
    applying said output data to drive an audio speaker with audio frequency signals derived from said encrypted file.

2. The process of claim 1, further comprised of:
    said physical characteristics comprised of each of said tracks occupying potentially different lengths when written on the recording medium; and
    forming said decryption code based upon values of said lengths.

3. The process of claim 1, further comprised of:
    said physical characteristics comprised of each of said tracks requiring potentially different durations when read from the recording medium; and
    forming said decryption code based upon values of said durations.

4. The process of claim 1, further comprised of:
    said physical characteristics comprised of each of said tracks occupying potentially different lengths on the recording medium and each of said tracks requiring potentially different durations when read from the recording medium; and
    forming said decryption code based upon values of said lengths and said durations.

5. The process of claim 1, further comprised of:
    storing a decryption algorithm with one of said memories; and
    converting said decrypted file into said decrypted data by sequentially applying said decryption algorithm to said encrypted file as successive increments of said encrypted file are read from said recording medium, in dependence upon said decryption code.

6. The process of claim 1, further comprised of:

storing a decryption algorithm with one of said memories; and converting said decrypted file into said decrypted data by applying said decryption algorithm to said encrypted file in dependence upon said decryption code.

7. The process of claim 1, further comprised of:

operationally coupling a monitor to said personal computer;

employing said microprocessor to drive said monitor to display visual images varying in correspondence with said output data.

8. A process for operating a personal computer, comprising:

assembling a plurality of audio files representing sequences of audio frequency sounds;

manually applying via an input device comprised of one of a keyboard, a touchpad and a mouse operationally coupled to a microprocessor and one or more memories access by said microprocessor of said personal computer, an indication establishing a selection of an unencrypted selected one of said audio files comprised of unencrypted data recordable on a plurality of distinct tracks when written on a recording medium, with each of said tracks providing potentially different physical characteristics when written upon the recording medium;

forming an encryption code based upon values of said physical characteristics;

converting said unencrypted data into encrypted data in dependence upon said encryption code;

writing said encrypted data onto the recording medium; and reading said encrypted data into one of said memories.

9. The process of claim 8, further comprised of determining said physical characteristics from said encrypted data when written onto the recording medium.

10. The process of claim 8, further comprised of determining said physical characteristics from said unencrypted data when written onto the recording medium.

11. The process of claim 8, further comprised of:

said physical characteristics comprised of each of said tracks occupying potentially different lengths when written on the recording medium; and forming said encryption code based upon values of said lengths.

12. The process of claim 11, further comprised of:

forming a decryption code based upon said values of said physical characteristics;

converting said encrypted data into decrypted data in dependence upon said decryption code;

converting said decrypted data into output data; and applying said output data to drive an audio speaker with audio frequency signals derived from said encrypted file.

13. The process of claim 8, further comprised of:

said physical characteristics comprised of each of said tracks requiring potentially different durations when read from the recording medium; and forming said encryption code based upon values of said durations.

14. The process of claim 13, further comprised of:

forming a decryption code based upon said values of said physical characteristics;

converting said encrypted data into decrypted data in dependence upon said decryption code;

converting said decrypted data into output data; and applying said output data to drive an audio speaker with audio frequency signals derived from said encrypted file.

15. The process of claim 8, further comprised of:

said physical characteristics comprised of each of said tracks occupying potentially different lengths on the recording medium and each of said tracks requiring potentially different durations when read from the recording medium; and forming said encryption code based upon values of said lengths and said durations.

16. The process of claim 8, further comprised of:

forming a decryption code based upon said values of said physical characteristics;

converting said encrypted data into decrypted data in dependence upon said decryption code;

converting said decrypted data into output data; and applying said output data to drive an audio speaker with audio frequency signals derived from said encrypted file.

17. A personal computer, comprising:

a microprocessor;

one or more memories accessed by said microprocessor;

an input device comprised of one of a keyboard, a touchpad and a mouse operationally coupled to said microprocessor, enabling manual input of an indication establishing a selection of an encrypted file comprised of a plurality of distinct tracks stored on a recording medium, with each of said tracks providing potentially different physical characteristics as recorded upon the recording medium;

a driver reading encrypted data from said encrypted file selected;

said microprocessor forming a decryption code based upon values of said physical characteristics of said selected encrypted file, converting said encrypted data into decrypted data in dependence upon said decryption code, and converting said decrypted data into output data;

an audio speaker; and an audio output circuit applying said output data to drive said audio speaker with audio frequency signals derived from said encrypted file.

18. The personal computer of claim 17, further comprised of:

said physical characteristics comprised of each of said tracks occupying potentially different lengths when written on the recording medium; and said microprocessor forming said decryption code based upon values of said lengths.

19. The personal computer of claim 17, further comprised of:

said physical characteristics comprised of each of said tracks requiring potentially different durations when read from the recording medium; and said microprocessor forming said decryption code based upon values of said durations.

20. The personal computer of claim 17, further comprised of:

said physical characteristics comprised of each of said tracks occupying potentially different lengths on the recording medium and each of said tracks requiring potentially different durations when read from the recording medium; and said microprocessor forming said decryption code based upon values of said lengths and said durations.

* * * * *